United States Patent Office 3,048,483
Patented Aug. 7, 1962

3,048,483
SYNERGISTIC HERBICIDAL COMPOSITION
Edward D. Weil, Lewiston, Edwin Dorfman, Grand Island, and Jack S. Newcomer, Wilson, N.Y., assignors to Hooker Chemical Corporation, Niagara Falls, N.Y., a corporation of New York
No Drawing. Filed Apr. 3, 1959, Ser. No. 803,833
6 Claims. (Cl. 71—2.6)

This invention relates to a synergistic herbicidal composition. More specifically this invention resides in a novel herbicidal composition comprising 2,3,6-trichlorophenylacetic acid and at least one compound selected from the group consisting of trichloroacetic acid (PCA), $\alpha,\alpha$-dichloropropionic acid (dalapon), and $\alpha,\alpha,\beta$-trichloropropionic acid. This application is a continuation-in-part of copending applications, Serial No. 692,046, filed October 24, 1957, now abandoned, and Serial No. 730,051, filed April 22, 1958.

The herbicidal mixtures of this invention possess new and unobvious properties not logically predictable from the individual activities of the ingredient compounds. The surprising effect of this mixture is that the ingredient compounds enhance the effect of each other. Thus, applicants have found that the composition of this invention is much more herbicidally active than would be expected on the basis of the additivity of the two ingredient compounds.

The compositions of this invention are particularly useful in places where it is undesirable to have plant growth such as along railroad right of ways, highway guard rails, golf courses, pipelines, etc. Soil sterilization of this type in the prior art has been quite costly and a major need exists for soil sterilants which are effective and yet economical. The composition of this invention because of the desirable activities of its components and because of the large degree of synergism between the two compounds provides such a sterilant.

2,3,6-trichlorophenylacetic acid alone not only controls the weeds present at the time of application, but it has a high residual effect in controlling the emergence of weeds from the soil over considerable periods of time ranging up to two years after application, depending on the rates of application. The preparation of 2,3,6-tricholorophenylacetic acid is defined in parent application S.N. 692,046. Trichloroacetic acid, $\alpha,\alpha$-dichloropropionic acid, and $\alpha,\alpha,\beta$-trichloropropionic acid are well-known herbicides having the common function of greater activity on monocotyledonous (grassy) species than on dicotyledonous (broadleaf) species. The preparations of these known compounds can be found in a widely used reference book by Huntress, Organic Chlorinated Compounds (1948 edition). The preparation of trichloroacetic acid is given on page 139, the process of preparing $\alpha,\alpha$-dichloropropionic acid on page 807, and the process of preparing $\alpha,\alpha,\beta$-trichloropropionic acid on page 162. Combinations of 2,3,6-trichlorophenylacetic acid or its derivatives with trichloroacetic acid, $\alpha,\alpha$-dichloropropionic acid, and $\alpha,\alpha,\beta$-trichloropropionic or their derivatives are far more herbicidally active than would be expected on the basis of additivity. It was particularly surprising and unexpected that the chlorinated aliphatic acid component, which is per se comparatively inactive on broadleaf weeds, would contribute in a major degree to the herbicidal effect of these mixtures on broadleaf weeds. In view of the unkown physiological mechanisms involved in herbicidal action it is difficult to offer any theoretical explanation for this observed synergistic effect. It is, of course, intended when applicants refer to 2,3,6-trichlorophenylacetic acid, trichloroacetic acid, $\alpha,\alpha$-dichloropropionic, and $\alpha,\alpha,\beta$-trichloropropionic acid that any of the derivatives be considered included, since to use a derivative of the acid would merely be a matter of choice, design or expediency. The rates, however, for convenience sake will be given throughout this disclosure in terms of the acid. It is also preferred to use the composition of this invention in aqueous solutions, or as dry solids, and for economic reasons the sodium salt is preferred. Solid carriers such as clay, a borate mineral or vermiculite may also be included when the dry formulation is used. Formulations may contain emulsifying agents, such as sorbitol, laurates, wetting agents, and carriers in accordance with the well-established practices in the herbicidal field. Combinations of this herbicide with other known herbicides which may or may not be involved in the synergistic effect may be used without departing from the spirit of this invention.

The synergism of 2,3,6-trichlorophenylacetic acid plus a compound selected from the group consisting of tricholoracetic acid, $\alpha,\alpha$-dichloropropionic acid, and $\alpha,\alpha,\beta$-trichloropropionic acid has been observed to be especially large at ratios approximately 1:1 to 1:8. Although this ratio is preferred the synergistic effect is not absent on either side of this range. It is preferred to employ the 2,3,6-trichlorophenylacetic acid at rates of one to forty pounds per acre, and the trichloroacetic, dichloropropionic, or trichloropropionic acids at from one to two hundred pounds per acre. It is obvious, however, that this invention is intended to include any combination of 2,3,6-trichlorophenylacetic acid and the trichloroacetic, dichloropropionic, or trichloropropionic acids which exhibit a synergistic effect. The following examples will further illustrate the present invention.

*Example 1*

A representative formulation of the invention was prepared by mixing the following:

| | Parts by weight |
|---|---|
| Sodium 2,3,6-trichlorophenylacetate | 10 |
| Sodium trichloroacetate | 40 |
| Nacconol SL (a sodium salt of a sulfonated alkyl-aromatic hydrocarbon) | 2 |
| Permacleer 80 (a sodium salt of an ethylene diamine tetraacetic acid) | 4 |
| Water | 100 |

*Example 2*

Another representative formulation is the following:

| | Parts by weight |
|---|---|
| Sodium 2,3,6-trichlorophenylacetate | 3 |
| Sodium $\alpha,\alpha$-dichloropropionate | 3 |
| Sodium tripolyphosphate (wetting and sequestering agent) | 2 |

The ingredients are blended and ground to make a dry powder which is dissolved in water to prepare the spray solution.

*Example 3*

A formulation similar to that of Example 2 is made substituting sodium $\alpha,\alpha,\beta$-trichloropropionate for sodium $\alpha,\alpha$-dichloropropionate.

*Example 4*

An area in western New York, infested with quackgrass, wild carrot, chicory, dock, ragweed, plantain, oxalis, daisy, yarrow, foxtail, hedge bindweed and mustard was sprayed with aqueous solutions of the test chemicals formulated as in the examples above. After one year, the treated areas were inspected, with the results as given below:

| Rates in Lbs./Acre of Chemical | Percent Broadleaf Weed Control | Percent Grassy Weed Control |
|---|---|---|
| 1. Sodium 2,3,6-trichlorophenylacetate (5) | 40 | 0-5 |
| 2. Sodium 2,3,6-trichlorophenylacetate (10) | 70 | 20 |
| 3. Sodium trichloroacetate (10) | 0 | 10 |
| 4. Sodium trichloroacetate (40) | 0 | 70 |
| 5. Sodium $\alpha,\alpha$-dichloropropionate (10) | 0 | 90 |
| 6. Sodium 2,3,6 - trichlorophenylacetate (10) plus sodium trichloroacetate (10). | 85 | 85 |
| 7. Sodium 2,3,6 - trichlorophenylacetate (10) plus sodium trichloroacetate (40). | 99-100 | 99-100 |
| 8. Sodium 2,3,6-trichlorophenylacetate (5) plus sodium trichloroacetate (40). | 90 | 90 |
| 9. Sodium 2,3,6 - trichlorophenylacetate (10) plus sodium $\alpha,\alpha$-dichloropropionate (10). | 100 | 95-100 |
| 10. Sodium 2,3,6 - trichlorophenylacetate (5) plus sodium $\alpha,\alpha$-dichloropropionate (10). | 70 | 50 |

In similar tests, sodium $\alpha,\alpha,\beta$-trichloropropionate behaved, within the error of the experiments, similarly to sodium $\alpha,\alpha$-dichloropropionate.

The examples of the composition of our invention, and methods of preparing and utilizing them which have been described in the foregoing specification, have been given for purpose of illustration, not limitation. Many other modifications and ramifications will naturally suggest themselves to those skilled in the art, based on the disclosure of our basic discovery. These are intended to be comprehended within the scope of our invention.

We claim:

1. A herbicidal composition comprising a phytotoxic amount of a compound selected from the group consisting of 2,3,6-trichlorophenylacetic acid and its alkali metal salts, and a phytotoxic amount of a compound selected from the group consisting of trichloroacetic acid, alpha, alpha-dichloropropionic acid, and alpha,alpha,beta-trichloropropionic acid and their alkali metal salts.

2. A herbicidal composition comprising an alkali metal salt of 2,3,6-trichlorophenylacetic acid and a compound selected from the group consisting of the alkali metal salts of trichloroacetic acid, alpha,alpha-dichloropropionic acid, and alpha,alpha,beta-trichloropropionic acid in a ratio of about 1:1 to 1:8.

3. A herbicidal composition comprising a phytotoxic amount of an alkali metal salt of 2,3,6-trichlorophenylacetic acid and a phytotoxic amount of an alkali metal salt of trichloroacetic acid.

4. A herbicidal composition comprising a phytotoxic amount of an alkali metal salt of 2,3,6-trichlorophenylacetic acid and a phytotoxic amount of an alkali metal salt of alpha,alpha-dichloropropionic acid.

5. A herbicidal composition comprising a phytotoxic amount of an alkali metal salt of 2,3,6-trichlorophenylacetic acid and a phytotoxic amount of an alkali metal salt of alpha,alpha,beta-trichloropropionic acid.

6. A method of controlling weeds which comprises applying per acre of ground to be treated a herbicidal composition containing 1 to 40 pounds of a compound selected from the group consisting of 2,3,6-trichlorophenylacetic acid and its alkali metal salts and 1 to 200 pounds of a compound selected from the group consisting of trichloroacetic acid, alpha,alpha-trichloropropionic acid, alpha, alpha-beta-trichloropropionic acid, and their alkali metal salts.

References Cited in the file of this patent

UNITED STATES PATENTS

| 2,444,905 | Sexton | July 13, 1948 |
| 2,622,974 | Swezey | Dec. 23, 1952 |
| 2,622,975 | Zimmerman et al. | Dec. 23, 1952 |
| 2,848,470 | Girard | Aug. 19, 1958 |

FOREIGN PATENTS

| 790,599 | Great Britain | Feb. 12, 1958 |

OTHER REFERENCES

Johnson et al. in "Proceedings, Northeastern Weed Control Conference," Jan. 7, 8, 9, 1959, pages 460–470.